United States Patent
Porter et al.

[11] 3,735,478
[45] May 29, 1973

[54] METHODS FOR MAKING BI-METALLIC PIPE

[75] Inventors: Milton Porter, Pittsburgh, Pa.; Warren Kearns, Steubenville, Ohio; Conrad Washek, Doraville; Paul Lambert, Savannah, both of Ga.

[73] Assignee: L. B. Foster Company, Pittsburgh, Pa.

[22] Filed: Jan. 6, 1971

[21] Appl. No.: 104,263

[52] U.S. Cl. .............29/477.3, 29/497, 138/142, 219/62
[51] Int. Cl. .................................B23k 31/02
[58] Field of Search................29/477.7, 477.3, 29/471.7, 477, 497; 219/62, 137; 138/142, 144

[56] References Cited

UNITED STATES PATENTS

| | | | |
|---|---|---|---|
| 1,712,090 | 5/1929 | Murphy | 29/477.7 |
| 2,050,326 | 8/1936 | Hopkins | 29/471.7 X |
| 2,054,939 | 9/1936 | Larson | 29/471.7 X |
| 2,164,267 | 6/1939 | Black | 29/477.7 X |
| 2,311,138 | 2/1943 | Swartz | 29/477.7 X |
| 2,837,626 | 6/1958 | Buck et al. | 29/477.7 X |
| 2,927,371 | 3/1960 | Hays | 29/477.7 X |
| 2,937,436 | 5/1960 | Butler et al. | 29/477.3 X |
| 3,443,306 | 5/1969 | Meyer | 29/471.7 |

*Primary Examiner*—J. Spencer Overholser
*Assistant Examiner*—Richard Bernard Lazarus
*Attorney*—Buell, Blenko & Ziesenheim

[57] ABSTRACT

A method for making bi-metallic pipe and a bi-metallic pipe are provided in which a strip of carbon steel having fixed thereto a strip of corrosion resistant metal of the same width is spirally wound into a pipe and welded with a first weldment in the corrosion resistant metal extending into the carbon steel and a second weldment in the carbon steel extending into the first weldment.

4 Claims, 2 Drawing Figures

PATENTED MAY 29 1973

3,735,478

INVENTORS
Milton Porter, Warren Kearns,
Conrad Washek & Paul Lambert

*their attorneys*

METHODS FOR MAKING BI-METALLIC PIPE

The need for pipe having an inner corrosion resistant lining and an outer shell of lower cost material has long been recognized. Typical of such a pipe is one formed of carbon steel with a stainless steel or other corrosion resistant lining. Conventionally such a pipe is formed by taking a carbon steel pipe and fabricating into it a stainless steel liner. This is generally slow and expensive and there are many problems in connection with both forming and bonding the lining. We have invented a method of forming such pipe which is rapid and much less expensive than other conventional methods and which provides a firm bonding of the several parts.

We have found that bi-metallic pipe of carbon steel lined with stainless steel or other corrosion resistant metal can be formed by first making a strip of carbon steel with a strip of stainless bonded to it, trimming to a uniform width, spirally wrapping the so-formed bi-metallic strip into a pipe shape, internally welding the stainless strip edges together with a corrosion resist weld penetrating the carbon steel and then externally welding the carbon steel edges with a weld which penetrates the internal weld to form a spiral weld pipe.

Preferably, we provide a process in which a strip of corrosion resistant metal, e.g., stainless steel, is laid over a strip of carbon steel of like width and bonded to it by spot welding, by cementing, e.g., epoxy cement, or by some other form of bonding. In the case of stainless steel linings the edges of the stainless steel spiral are preferably welded by a plasma or heli-arc weld arranged to weld the stainless steel edges and to penetrate into the carbon steel. The carbon steel strip edges are then welded from the opposite side by the submerged arc process or the like with a weld that penetrates the weld formed in the carbon steel by the stainless steel welding operation but does not penetrate through the carbon steel into the stainless steel. This is important in order to avoid forming brittle intermetallic compounds along the spiral joint which would weaken the joint.

In the foregoing general description of our invention we have set out certain objects and advantages of our invention. Other objects, purposes and advantages of our invention will be apparent from a consideration of the following description and the accompanying drawings in which.

Figure 1:
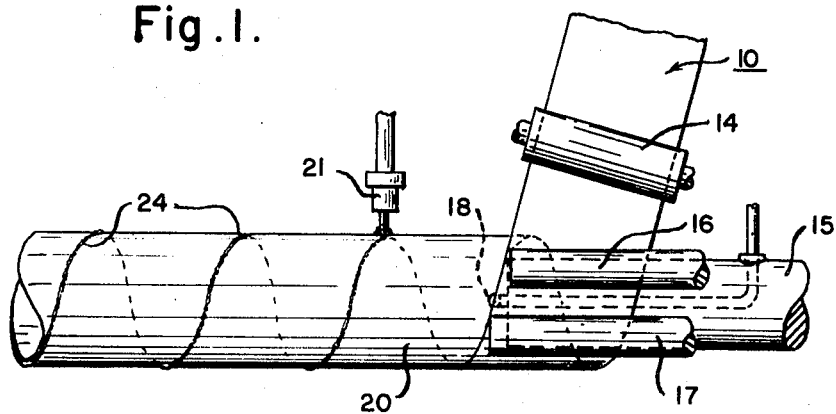
FIG. 1 is an isometric schematic view of a method according to our invention.
Figure 2:
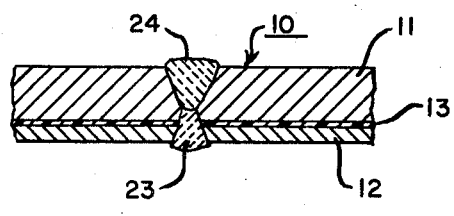
FIG. 2 is a fragmentary section of a pipe acco to our invention.

Referring to the drawings, we have illustrated a strip 10 of carbon steel 11 and stainless steel 12 bonded together by a layer of epoxy cement 13. The strip 10 is fed by a feed roll 14 at an angle onto mandrel 15 beneath forming rolls or elements 16 and 17. A plasma welding head 18 enters the formed pipe 20 beneath the mandrel and is adapted to weld the joint formed by the stainless steel edges immediately behind the mandrel 15. A submerged arc welding head 21 is provided at a point following welding head 18 to weld the edges of the carbon steel onto shell 12. The welding conditions are arranged so that the plasma weldment 23 of the stainless steel enters into the carbon steel and the submerged arc weldment 24 enters the plasma weld 23 but does not pass through the carbon sheet 11.

In the foregoing specification we have set out certain preferred embodiments and practices of our invention. However, it will be understood that this invention may be otherwise embodied.

We claim:

1. A method of forming corrosion resistant pipe comprising the steps of:
   a. forming a strip of carbon steel having fixed thereto a strip of stainless steel of the same width,
   b. spirally forming a pipe from said strip with the stainless steel forming the inner periphery,
   c. welding the adjoining spiral edges of the corrosion resistant metal with a first weldment which enters into the carbon steel outer strip and
   d. welding the adjoining spiral edges of the carbon steel strip with a second weld-ment which enters the first weldment while remaining wholly within the carbon steel strip.

2. A method as claimed in claim 1 wherein the first weldment is a plasma weld.

3. A method as claimed in claim 1 wherein the first weldment is formed by heli-arc welding.

4. A method as claimed in claim 2 wherein the second weldment is formed by submerged arc welding.

* * * * *